US 6,577,031 B2

(12) United States Patent
Morooka et al.

(10) Patent No.: US 6,577,031 B2
(45) Date of Patent: Jun. 10, 2003

(54) DC FAN MOTOR AND METHOD OF MANUFACTURING SAME

(75) Inventors: Hideaki Morooka, Oita (JP); Toshifumi Tsutsumi, Oita (JP); Tomohiro Matsuyama, Oita (JP); Yuichi Noguchi, Oita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/886,811

(22) Filed: Jun. 22, 2001

(65) Prior Publication Data

US 2002/0030415 A1 Mar. 14, 2002

(30) Foreign Application Priority Data

Jun. 23, 2000 (JP) .......................................... 2000-188921

(51) Int. Cl.[7] .............................................. H02K 11/00
(52) U.S. Cl. ....................................... 310/68 R; 310/42
(58) Field of Search ................................ 310/68 R, 42

(56) References Cited

U.S. PATENT DOCUMENTS

| 3,815,378 A | * | 6/1974 | Hoenisch ..................... 62/183 |
| 5,045,740 A | * | 9/1991 | Hishinuma ............. 310/156.45 |
| 5,089,733 A | * | 2/1992 | Fukuoka ................. 310/156.05 |
| 5,095,238 A | * | 3/1992 | Suzuki et al. .......... 310/156.46 |
| 5,134,327 A | * | 7/1992 | Sumi et al. .................. 310/216 |
| 5,334,897 A | * | 8/1994 | Ineson et al. .................. 310/42 |
| 5,610,458 A | * | 3/1997 | Baker et al. .............. 310/68 R |
| 5,783,888 A | * | 7/1998 | Yamano ...................... 310/254 |
| 6,271,638 B1 | * | 8/2001 | Erdman et al. ............. 318/439 |
| 6,348,752 B1 | * | 2/2002 | Erdman et al. ............. 310/194 |
| 6,414,408 B1 | * | 7/2002 | Erdman et al. ............. 310/216 |

FOREIGN PATENT DOCUMENTS

| JP | 57-6385 | | 1/1982 | |
| JP | 2000014112 A | * | 1/2000 | .......... H02K/29/00 |
| JP | 2000-41370 | | 2/2000 | |
| JP | 2000-41395 | | 2/2000 | |

* cited by examiner

*Primary Examiner*—Joseph Waks
(74) *Attorney, Agent, or Firm*—Wenderoth, Lind & Ponack, L.L.P.

(57) ABSTRACT

A printed circuit board 6, a stator core 8, an AC power source connector 14, a step-down circuit 15, a rectifier circuit 16, and a control circuit 18 are molded into one piece using a molding material 20 to form a stator. A rotor 9 is placed on the stator core 8. DC high voltage from the rectifier circuit 16 is supplied directly to stator coils 7 as a driving power source, and DC low voltage from the step-down circuit is supplied to the control circuit as a control power source.

24 Claims, 13 Drawing Sheets

DC FAN MOTOR AND METHOD OF MANUFACTURING SAME

FIELD OF THE INVENTION

The present invention relates to a DC fan motor that forces cold air to circulate inside of a freezer or a refrigerator as well as other DC fan motors for a ventilating fan or the like, and particularly to a downsized DC fan motor having a DC power source, and a method of manufacturing the same.

BACKGROUND OF THE INVENTION

Freezing equipment, such as a refrigerator, is high power consuming equipment for household use; therefore, its power savings is desired. In freezing equipment, the compressor has the highest power consumption. The fan motor that forces cold air to circulate inside of the freezing equipment increases the workload of the compressor, which lowers the temperature inside of the freezing equipment, because the fan motor itself generates heat. For this reason, power savings of a fan motor is important for power savings of freezing equipment.

Prior Art 1

A shaded-pole AC fan motor 1 shown in FIG. 13 has conventionally been used as a fan motor for freezing equipment because of the following advantages: the motor can directly operate on an AC power source, has a small number of components, and is inexpensive. This AC fan motor 1 has a high power consumption of 9 to 10 W, a power loss of approximately 90% and generates heat at a temperature of approximately 40° C. Moreover, having a thickness of approximately 48 mm, this AC fan motor is relatively large.

Prior Art 2

A DC fan motor 2 shown in FIG. 15 has conventionally been used as a fan motor for freezing equipment instead of AC fan motor 1 because motor 2 has an advantage of requiring a low power consumption. An AC-DC conversion power source 3 is attached to the outside of DC fan motor 2 in order to supply DC power to DC fan motor 2. When motor driving power is obtained by AC-DC conversion power supply 3, voltages are stepped down via a resistor or transformer and thus a power loss is produced. In addition, motor 2 requires a lead connecting DC fan motor 2 and AC-DC conversion power source 3 and this causes the motor to have a more complicated structure and a larger size.

It is an object of the present invention to provide a DC fan motor for freezing equipment or a ventilating fan that has a compact structure as a whole and a small power loss and to provide a method of manufacturing the same.

SUMMARY OF THE INVENTION

A DC fan motor in accordance with the present invention has a stator including a stator core, and a rotor placed in the stator core. The stator has the following components: a printed circuit board; the stator core having stator coils; an AC power source connector; a rectifier circuit that rectifies input AC power to obtain high DC voltage; a step-down circuit that obtains DC low voltage from the DC high voltage; a heat shock absorber fixedly attached to the printed circuit board; and a control circuit that controls the stator coils. These components are molded into one body to form a stator using a molding material. The DC high voltage from the rectifier circuit is supplied to the stator coils as a driving power source and the DC low voltage from the step-down circuit is supplied to the control circuit as a control power source. The present invention thus provides a compact DC fan motor for freezing equipment or the like with small power loss and low power consumption and that has a rectifier circuit and a control circuit integrated therein.

DETAILED DESCRIPTION OF THE INVENTION

Embodiment 1

Figure 1:
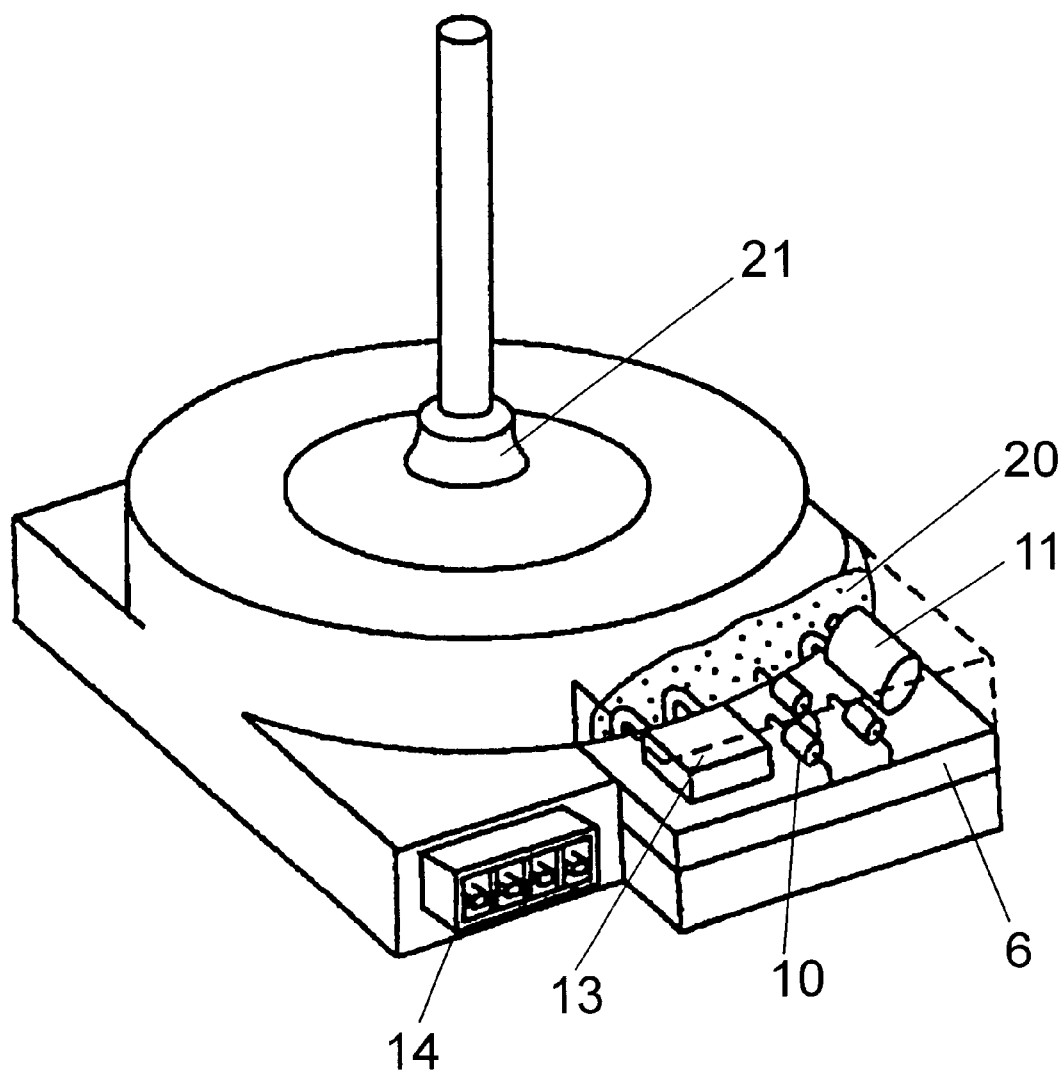
FIG. 1 is a perspective view of a DC fan motor in accordance with a first exemplary embodiment of the present invention.
Figure 2:
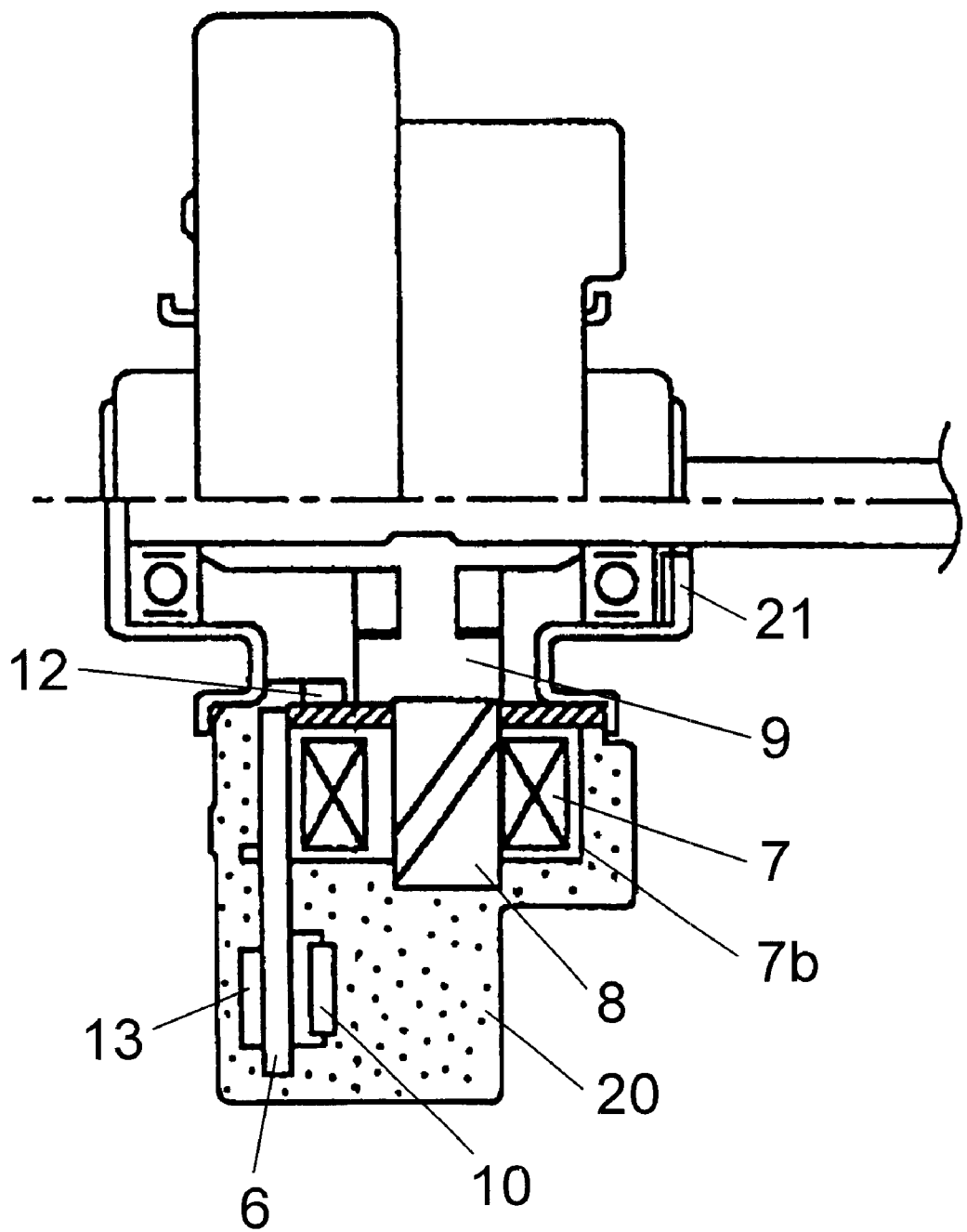
FIG. 2 is a partially sectional side view of the same DC fan motor.
Figure 3:
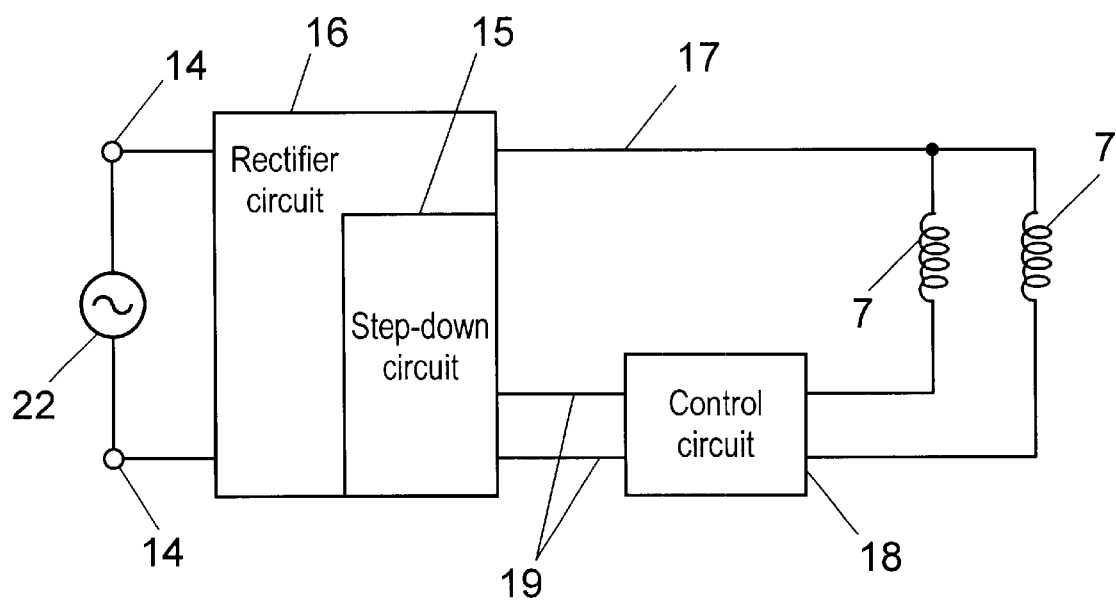
FIG. 3 is a schematic electrical connection diagram of the same DC fan motor.
Figure 4:
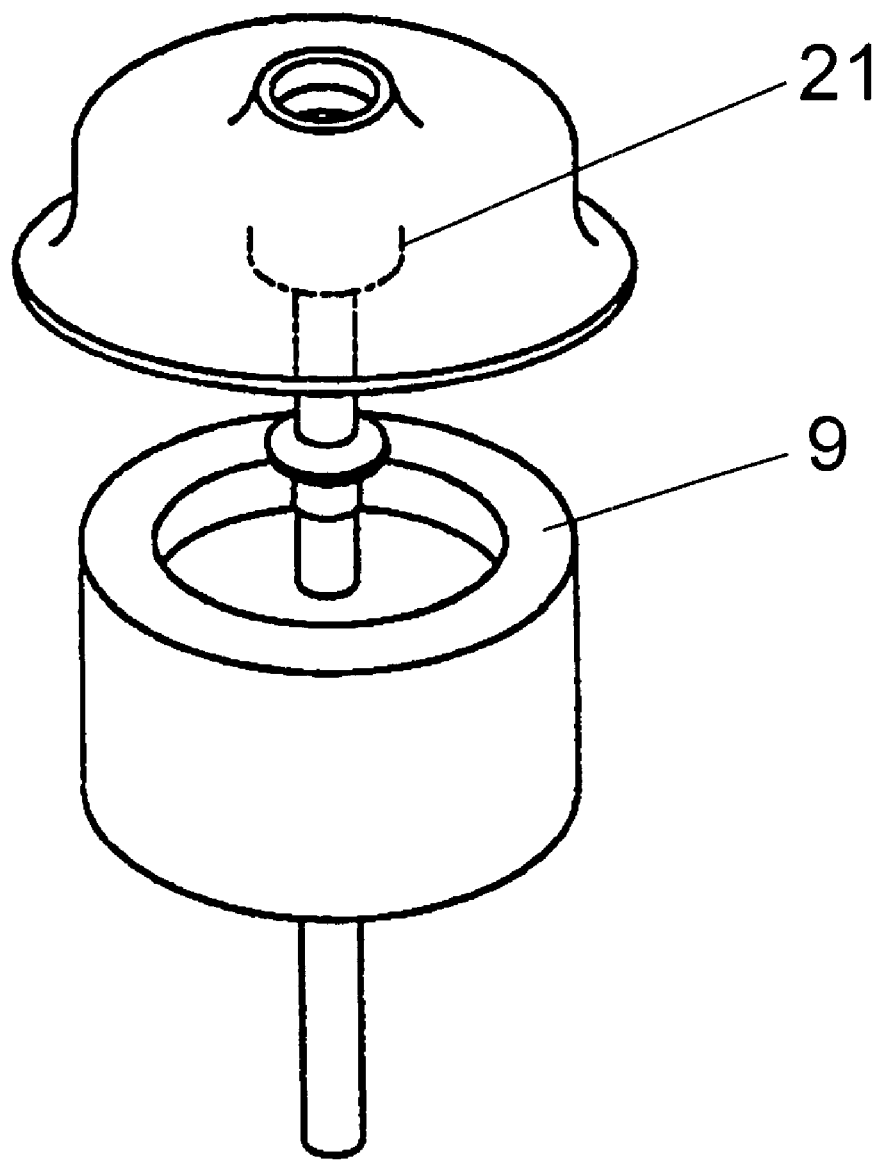
FIG. 4 is a perspective view of a rotor of the same DC fan motor.
Figure 5:
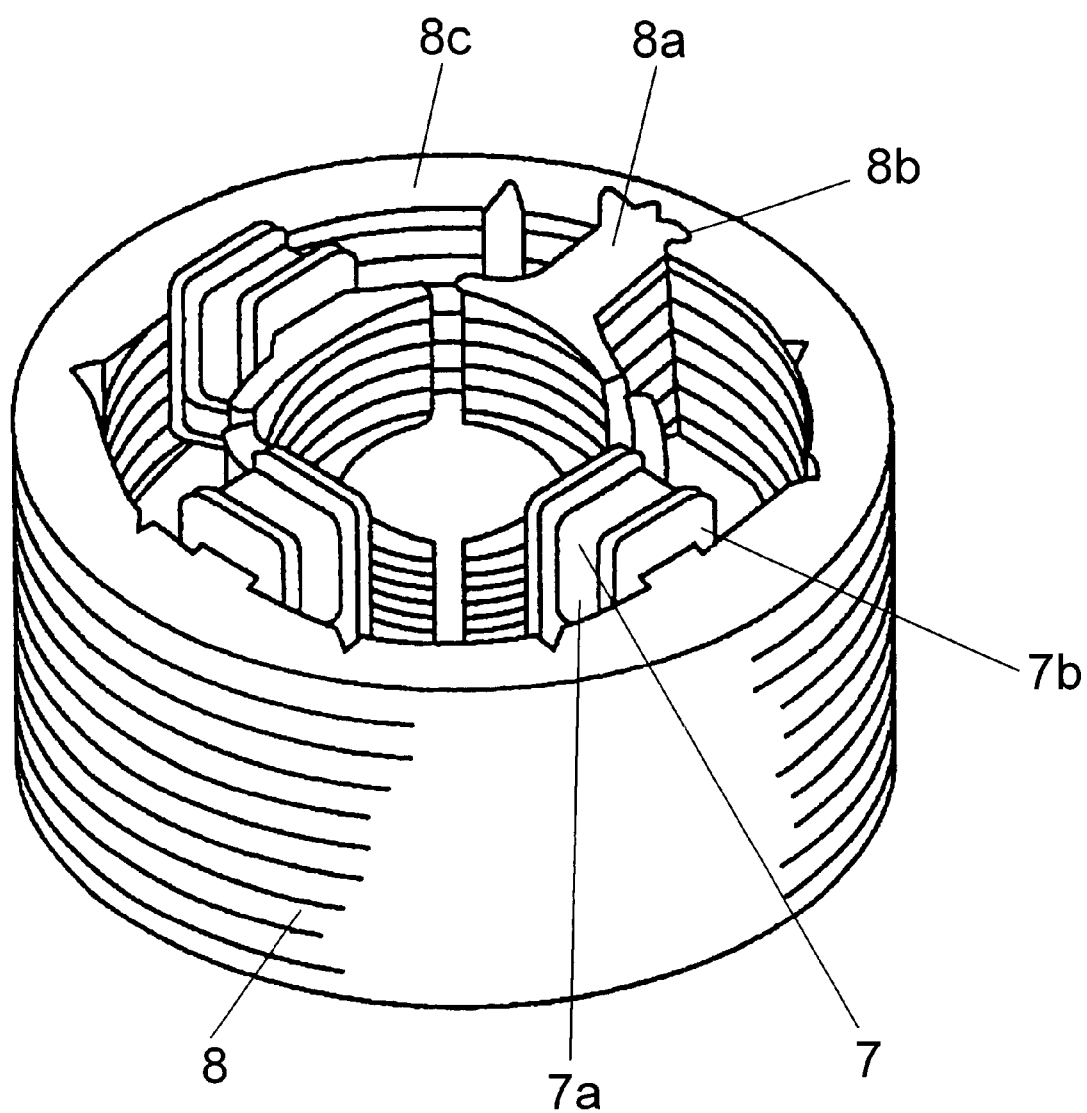
FIG. 5 is a perspective view of a stator core of the same DC fan motor.
Figure 6:
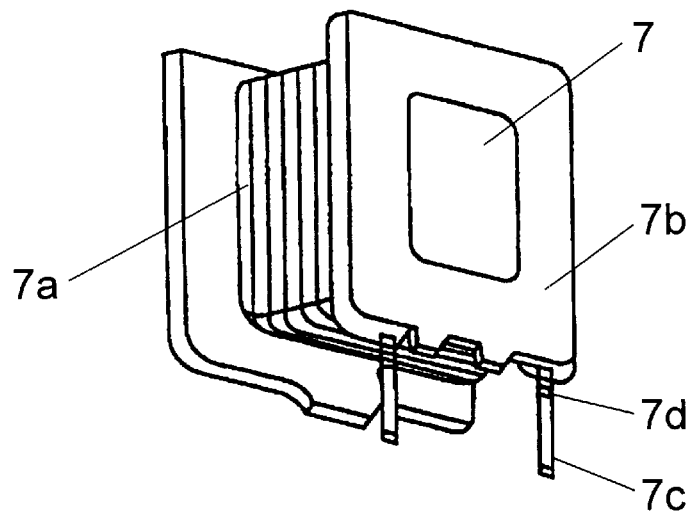
FIG. 6 is a perspective view of a stator coil of the same DC fan motor.
Figure 7:
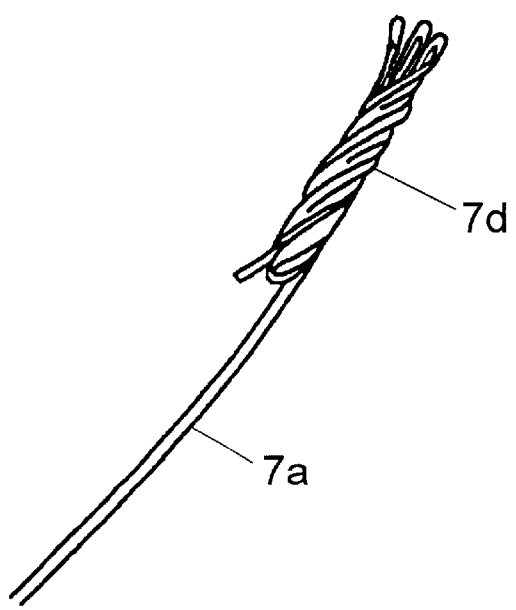
FIG. 7 is a perspective view of an end of the wound stator coil.

FIG. 1 is a perspective view of a DC fan motor in accordance with a first exemplary embodiment of the present invention, and FIG. 2 is a partially sectional side view of the same DC fan motor. As shown in FIGS. 1 and 2, a stator core 8 having stator coils 7 is attached to a printed circuit board 6. Printed circuit board 6 has the following components in a space outside of stator core 8: a rectifier circuit 16 comprising diodes 10, a smoothing capacitor 11, and other circuit elements; a step-down circuit 15; and a control circuit 18 comprising a magnetic pole detecting element 12, a driver element 13, and other circuit elements. Printed circuit board 6 also has, at the edge thereof, an AC power source connector 14 attached thereto. FIG. 3 is a schematic electrical connection diagram of the DC fan motor in accordance with this embodiment. AC power supplied from an AC power source 22 via AC power source connector 14 is converted into DC high voltage by rectifier circuit 16 comprising diodes 10 and smoothing capacitor 11. Step-down circuit 15 steps down the DC high voltage to DC low voltage. Printed circuit board 6 has wiring 17 for supplying the DC high voltage from rectifier circuit 16 directly to stator coils 7 as a driving power source and wiring 19 for supplying the DC low voltage from the step-down circuit to control circuit 18 as a control power source. Printed circuit board 6, stator core 8, AC power source connector 14, step-down circuit 15, rectifier circuit 16, and control circuit 18 are molded into one body using molding material 20, such as unsaturated polyester. A Rotor 9 is placed in a hollow space formed by stator core 8, and is rotatably held by bearings placed at both ends of the hollow space to construct the DC fan motor in accordance with this embodiment. Bearing frames 21 are directly press-fitted into the ends of the hollow space with a press-fit force of 50 to 200 Kgf. More specifically, as shown in FIG. 4, rotor 9 is made of a plastic magnet material formed into a cylindrical shape and has a plurality of N and S magnetic poles along the outer circumference thereof Stator core 8 is made of a ring-like core 8c and T-shaped poles 8a, as shown in FIG. 5. Stator core 8 is assembled in the following steps: mounting stator coils 7 onto poles 8a; placing poles 8a inside of ring-like core 8c; temporarily press-fitting the proximal ends of poles 8a into connecting recesses 8b provided in ring-like core 8c for distortion prevention, and connecting them by firmly press-fitting. As stator coils 7 shown in FIG. 6, fine electric wire 7a (0.08 mm in diameter in this embodiment) made of copper is used because a DC high voltage (DC 141 V obtained by rectification of a commercial power source of AC 100V in this embodiment) is applied to the wire. Electric wire 7a is wound around a coil bobbin 7b made of polyamide resin. An end 7d of the wire is wound around a terminal pin 7c attached to coil bobbin 7b, and soldered to the pin 7c. In this manner, stator coils 7 are constructed. Since stator coils 7 can be wound separately prior to the assembly of stator core 8, the winding operation is easy. Therefore, even when the electric wire of stator coils 7 is very fine, breaks in the wire made during the winding operation can be reduced. Moreover, since terminal pins 7c also serve as the legs for mounting stator core 8 onto printed circuit board 6, no other mounting members are required. This simplifies the mounting structure. As shown in FIG. 7, end 7d of the winding of stator coil 7 is folded and bundled a plurality of times, twisted three to five times, wound around terminal pin 7c, and soldered thereto for connection.

Figure 8:
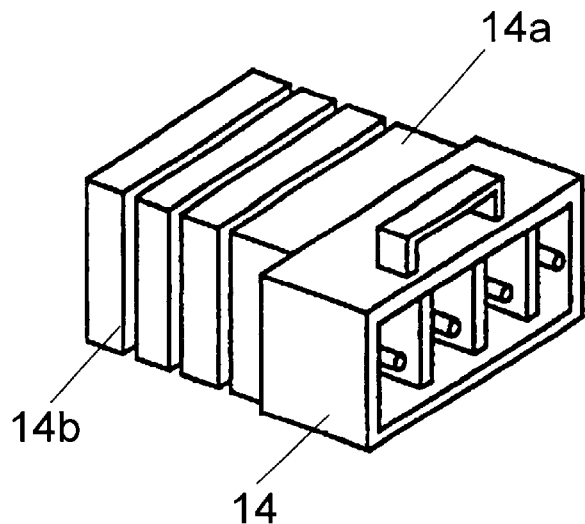
FIG. 8 is a perspective view of an AC power source connector of the same DC fan motor.
Figure 9:
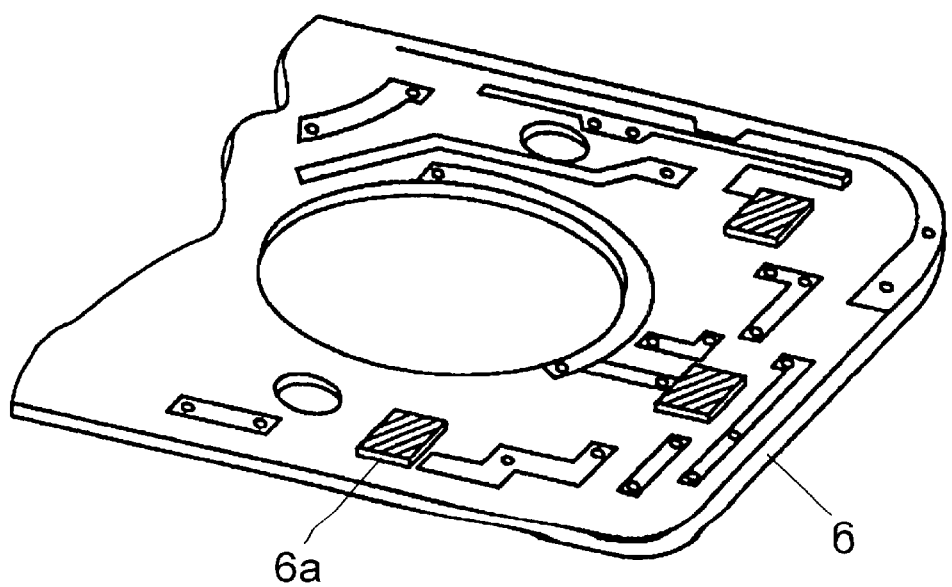
FIG. 9 is a perspective view of wiring of a printed circuit board of the same DC fan motor.

Therefore, even with stator coil 7 of a very fine wire, breaks in the wire made when end 7d of the winding is wound around terminal pin 7c for connection are prevented because end 7d of the winding is reinforced. As shown in FIG. 8, AC power source connector 14 has two or three annular grooves 14b along the outer periphery of an electrically insulating shell 14a for housing terminals therein. These annular grooves 14b make the insulating distance along the face longer and thus improve the insulating characteristics of AC power source connector 14. Annular grooves 14b also stabilize AC power source connector 14 onto printed circuit board 6 because molding material 20 enters into annular grooves 14b. As shown in FIG. 9, on printed circuit board 6, a heat shock absorber 6a, such as a quick-dry silicon bond is attached to a soldered connection of an arbitrary component, for example, an FET element, for the purpose of improved workability. The heat shock absorber can prevent an expansion and breaking of a soldered connection between each component and printed circuit board 6, which are caused by the heat applied during molding, and thus stabilizes the connection.

Figure 10:
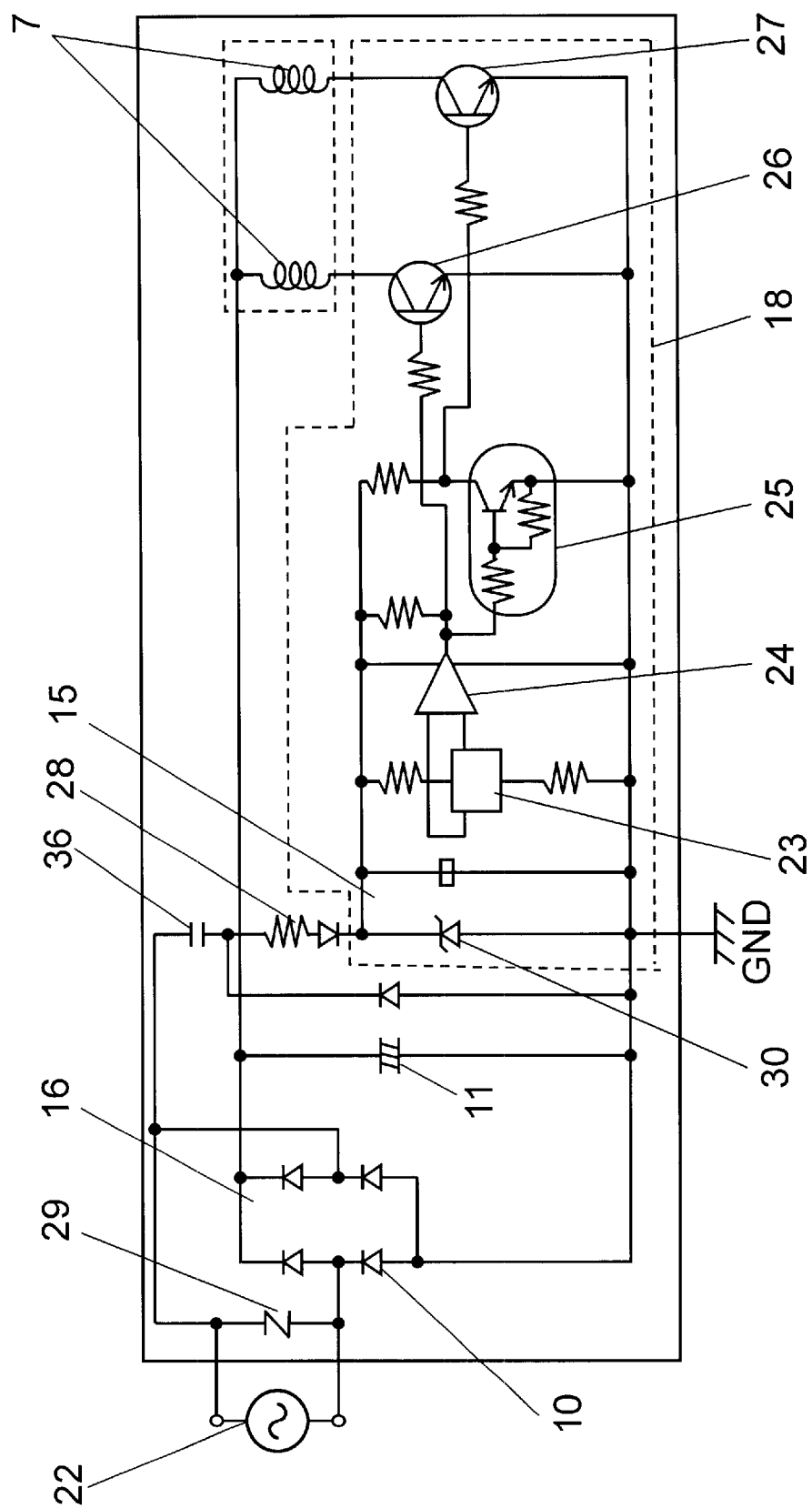
FIG. 10 is a detailed circuit diagram of the same DC fan motor.

Next, the electrical circuit of the DC fan motor of this embodiment is detailed with reference to FIG. 10. As shown in FIG. 10, rectifier circuit 16 performs full-wave rectification of AC 100 V using a plurality of diodes 10 to obtain a DC high voltage of 141 V, smoothes the voltage using smoothing capacitor 11, and supplies the DC high voltage directly to stator coils 7. Control circuit 18 has the following components: hall element 23 for detecting a magnetic pole of the rotor; comparator 24 for comparing the output of hall element 23; digital transistor 25 incorporating a resistor that inverts the output of comparator 24; controlling transistor 26 that is inserted into the energization circuit of stator coils 7 and has a control gate for receiving the output of comparator 24; and controlling transistor 27 that has a control gate for receiving the output of digital transistor 25. Step-down circuit 15 steps down the voltage using capacitor 36 and voltage-dividing circuit 28 and feeds the obtained DC low voltage of half-wave rectification to control circuit 18 as a control power source. As illustrated in FIG. 10, reference numeral 29 shows a varistor and reference numeral 30 shows a Zener diode. With this structure, DC high voltage is supplied to stator coils 7, stator coils 7 are controlled by control circuit 18, and the DC fan motor rotates as desired. Generally, DC fan motors consume less power than AC fan motors. In addition, supplying DC high voltage from rectifier circuit 16 directly to stator coils 7 can provide a DC fan motor having smaller power loss and lower power consumption. Control voltage is supplied to control circuit 18. However, since the control voltage is low and the power consumption of the transistors is low, their effects on the power consumption of the entire DC fan motor are extremely small. Consequently, the DC fan motor of this embodiment has an extremely low power consumption, i.e. approximately ¼ of that of a conventional AC fan motor. In addition, since printed circuit board 6, which has stator core 8, step-down circuit 15, rectifier circuit 16, and control circuit attached thereto, is not placed outside of the motor as external circuitry but is integrated with the motor in one body, the DC fan motor can be constructed compactly with an entire thickness of approximately 35 mm.

Embodiment 2

Figure 11:
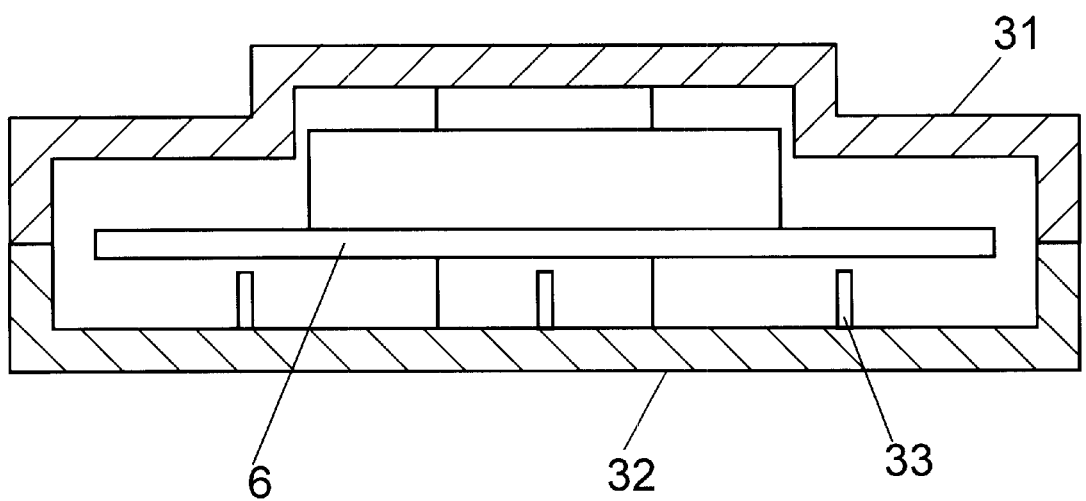
FIG. 11 is a cross sectional view of a mold having an upper part and a lower part that is used for molding a stator of the same DC fan motor.

FIG. 11 is a cross sectional view of a mold having upper part 31 and lower part 32 that are used for molding a stator of a DC fan motor in accordance with the present invention. The DC fan motor of the present invention is manufactured in the following steps: a) mounting stator core 8, AC power source connector 14, step-down circuit 15, rectifier circuit 16, and control circuit 18 onto printed circuit board 6 as shown in FIG. 2, and connecting circuits so that DC high voltage obtained by rectifying AC power source using rectifier circuit 16 is supplied to stator coils 7 as a driving power source and DC low voltage stepped down from the DC high voltage is supplied to control circuit 18 as a control power source; b) molding the above-mentioned printed circuit board 6, stator core 8, AC power source connector 14, rectifier circuit 16, and control circuit 18 into one body using molding material 20 where the mold has an upper part 31 and a lower part 32 to construct a stator of the DC fan motor; and c) inserting rotor 9 into stator core 8, press-fitting bearing frames 21 into the molded stator and assembling these components so that bearings in bearing frames 21 rotatably hold the rotor 9. During this molding step, the molding pressure is approximately 60 kg/cm$^2$ and the heating temperature is 120° C. The molding pressure may cause a warp or distortion to thin printed circuit board 6 placed in the mold and thus a connection between each component and the wiring network on printed circuit board 6 may come off or deteriorate. In this embodiment, either upper part 31 or lower part 32 of the mold has a plurality of pins 33 projected so that the tips of the pins are in proximity to one side of printed circuit board 6 to be molded. Therefore, pins 33 prevent warps or distortions of printed circuit board 6 caused by the molding pressure, and the connection between each component and the wiring network on printed circuit board 6 will not come off or deteriorate.

Figure 12:
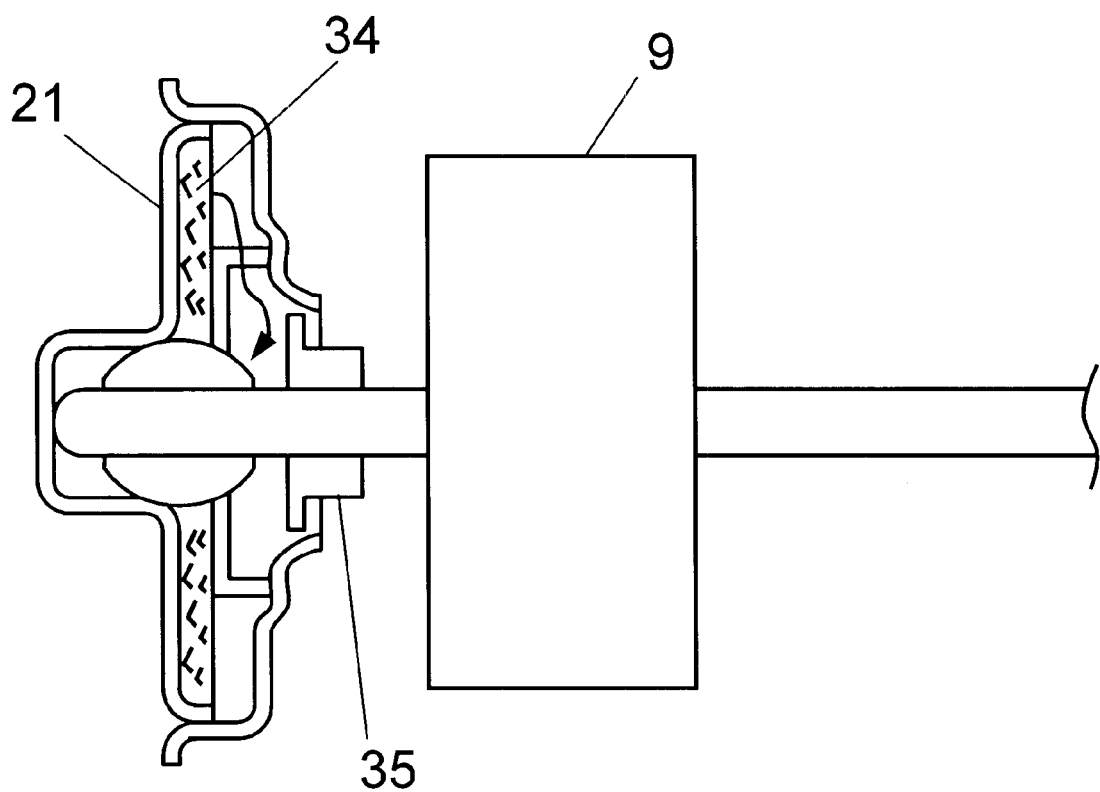
FIG. 12 illustrates a bearing frame having an oil impregnated bearing of the same DC fan motor.
Figure 13:
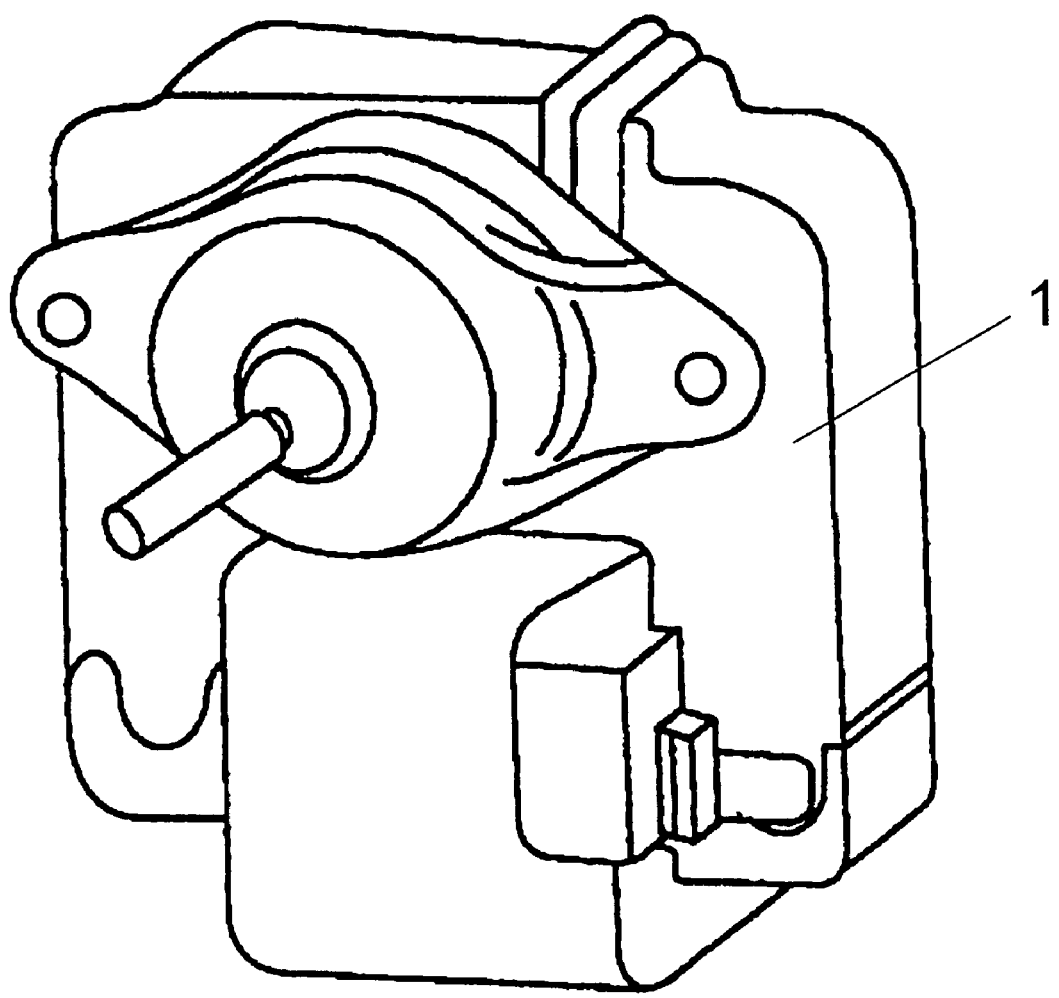
FIG. 13 is a perspective view of a conventional AC fan motor.
Figure 14:
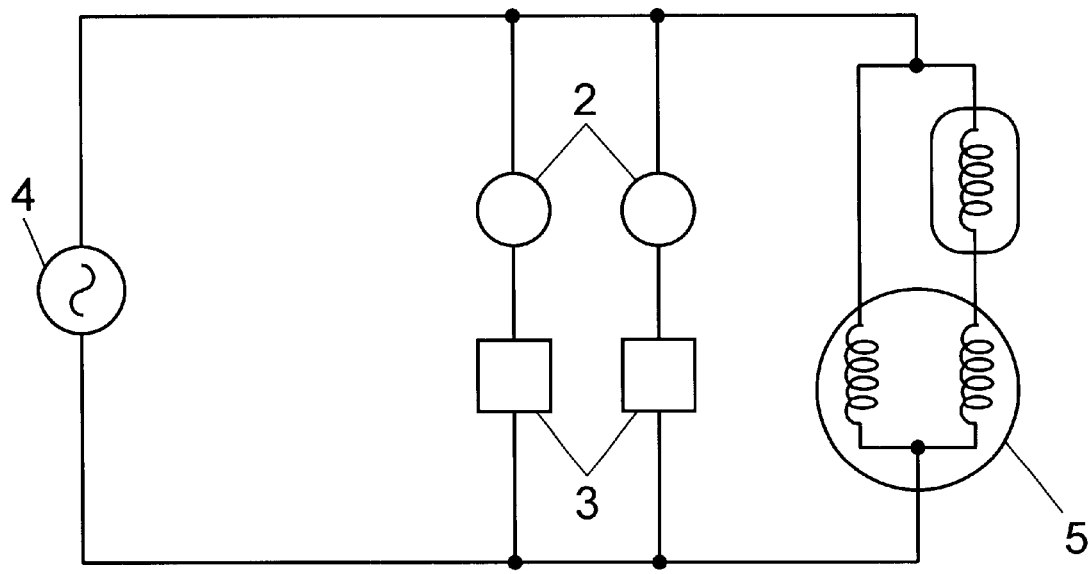
FIG. 14 is an electrical connection diagram of a refrigerator using a conventional DC fan motor.
Figure 15:
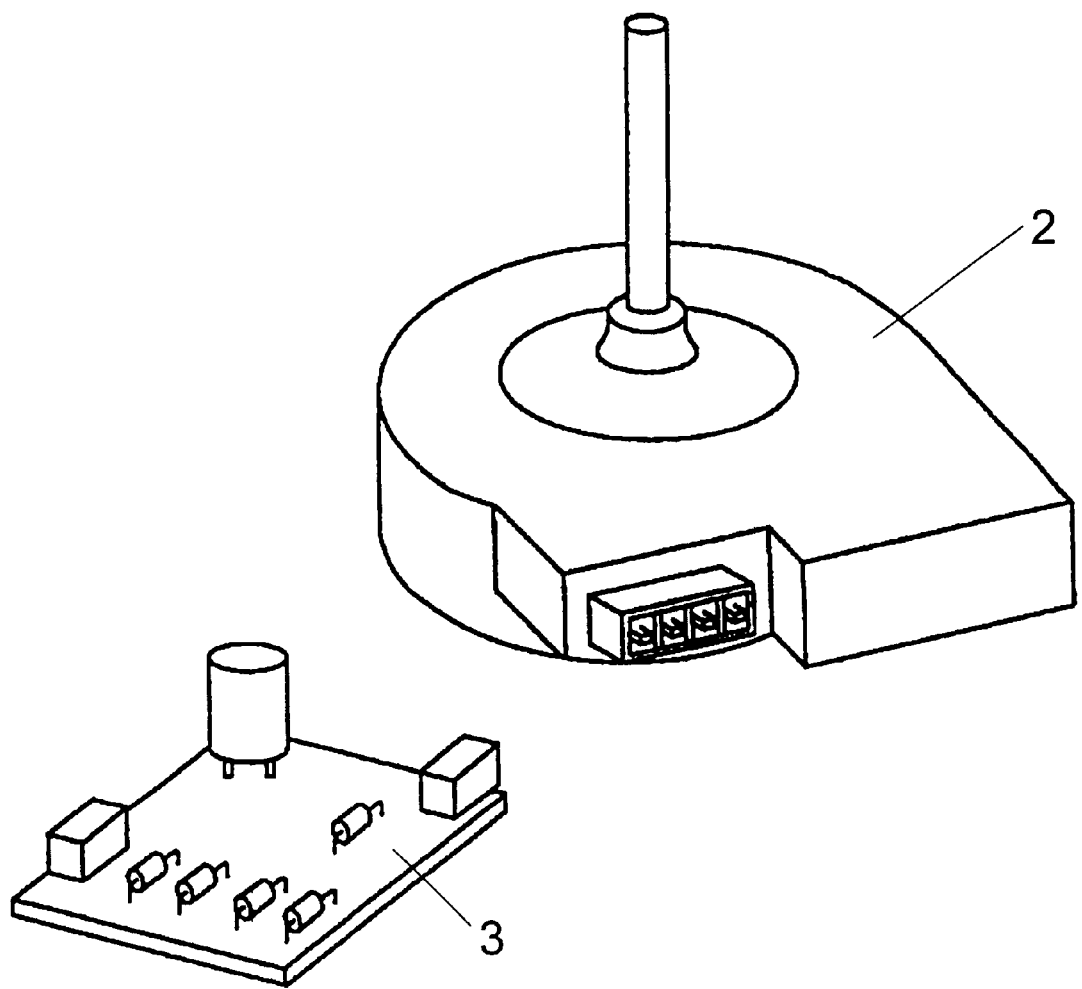
FIG. 15 is a perspective view of a conventional DC fan motor.

Although the DC fan motor in accordance with each of these embodiments is for freezing equipment, this DC fan motor can be also used for a relatively small ventilating fan. In addition, this motor can be used as a DC fan motor for cooling electronic devices, such as a personal computer. The bearings inside of bearing frames 21 used in each of the above embodiments can be an oil impregnated bearing as shown in FIG. 12. With the bearing shown in FIG. 12, a molded resin pipe 35 and a frame cover recover the oil from an oil-impregnated felt 34 so that the oil does not leak outside.

What is claimed is:

1. A DC fan motor comprising:
   a stator comprising a printed circuit board, said circuit board having a plurality of components mounted thereon, said components including
      a stator core having a stator coil,
      an AC power source connector,
      a rectifier circuit for rectifying input AC power to obtain a DC high voltage,
      a step-down circuit for obtaining a DC low voltage from the DC high voltage, and
      a control circuit for controlling said stator coil,
         wherein said printed circuit board has a heat shock absorber thereon, said heat shock absorber being attached to a soldered connection of an arbitrary component;
   a rotor inserted into said stator core; and
   a bearing frame having a bearing that rotatably holds said rotor;
   wherein the DC high voltage from said rectifier circuit is supplied to said stator coil as a driving power source and the DC low voltage from said step-down circuit is supplied to said control circuit as a control power source; and
   wherein said components are molded into one body to form said stator of said DC fan motor.

2. The DC fan motor as set forth in claim 1 wherein said printed circuit board has wiring for supplying the DC high voltage directly to said stator coil and wiring for supplying the DC low voltage to said control circuit.

3. The DC fan motor as set forth in claim 1 wherein said rotor is made of a plastic magnet material formed into a cylindrical shape.

4. The DC fan motor as set forth in claim 1 wherein said stator core is provided with a ring-like core and a pole, said stator coil is mounted on said pole, said pole is located inside said ring-like core with an end of said pole being press-fit in a connecting recess in said ring-like core.

5. The DC fan motor as set forth in claim 1 wherein said stator coil is wound around an electrical insulating bobbin having a terminal pin, and said terminal pin is connected to said printed circuit board so that said stator core is mounted on said printed circuit board.

6. The DC fan motor as set forth in claim 5 wherein an end of a winding of said stator coil is folded and bundled a plurality of times, said end being twisted and wound a plurality of times around said terminal pin so that said stator coil is connected to said terminal pin, said terminal pin being connected to said printed circuit board so that said stator coil is connected to said printed circuit board.

7. The DC fan motor as set forth in claim 1 wherein said AC power source connector comprises an electrically insulating shell for housing terminals therein, and wherein said shell has a plurality of annular grooves along an outer periphery thereof.

8. The DC fan motor as set forth in claim 1 wherein said control circuit comprises:
   a magnetic pole detecting element for detecting a magnetic pole of said rotor;
   a comparator for outputting a signal of said magnetic pole detecting element;
   a digital transistor for inverting output of said comparator; and
   transistors for controlling stator coils including said stator coil, said transistors being controlled by output of said comparator and output of said digital transistor, respectively.

9. The DC fan motor as set forth in claim 1 wherein said rectifier circuit and said control circuit are formed on said printed circuit board.

10. The DC fan motor as set forth in claim 1 wherein said DC fan motor comprises a freezing equipment fan motor.

11. The DC fan motor as set forth in claim 1 wherein said DC fan motor comprises a ventilating fan motor.

12. The DC fan motor as set forth in claim 1 wherein said DC fan motor operates from a DC high voltage of full-wave rectification and a DC low voltage of half-wave rectification, said DC fan motor having a capacitor that steps down the DC high voltage to the DC low voltage.

13. A DC fan motor comprising:
   a stator comprising a printed circuit board, said circuit board having a plurality of components mounted thereon, said components including
      a stator core having a stator coil,
      an AC power source connector,
      a rectifier circuit for rectifying input AC power to obtain a DC high voltage,
      a step-down circuit for obtaining a DC low voltage from the DC high voltage, and
      a control circuit for controlling said stator coil;
   a rotor inserted into said stator core; and
   a bearing frame having a bearing, said bearing rotatably holding said rotor, an oil recovery mechanism comprising a resin pipe, and a frame cover, wherein said frame cover is arranged so as to prevent impregnated oil from leaking outside;
   wherein the DC high voltage from said rectifier circuit is supplied to said stator coil as a driving power source and the DC low voltage from said step-down circuit is supplied to said control circuit as a control power source; and
   wherein said components comprised in the stator are molded into one body to form said stator of said DC fan motor.

14. The DC fan motor as set forth in claim 13 wherein said printed circuit board has wiring for supplying the DC high voltage directly to said stator coil and wiring for supplying the DC low voltage to said control circuit.

15. The DC fan motor as set forth in claim 13 wherein said rotor is made of a plastic magnet material formed into a cylindrical shape.

16. The DC fan motor as set forth in claim 13 wherein said stator core is provided with a ring-like core and a pole, said stator coil is mounted on said pole, said pole is located inside said ring-like core with an end of said pole being press-fit in a connecting recess in said ring-like core.

17. The DC fan motor as set forth in claim 13 wherein said stator coil is wound around an electrical insulating bobbin having a terminal pin, and said terminal pin is connected to said printed circuit board so that said stator core is mounted on said printed circuit board.

18. The DC fan motor as set forth in claim 17 wherein an end of a winding of said stator coil is folded and bundled a plurality of times, said end being twisted and wound a plurality of times around said terminal pin so that said stator coil is connected to said terminal pin, said terminal pin being connected to said printed circuit board so that said stator coil is connected to said printed circuit board.

19. The DC fan motor as set forth in claim 13 wherein said AC power source connector comprises an electrically insulating shell for housing terminals therein, and wherein said shell has a plurality of annular grooves along an outer periphery thereof.

20. The DC fan motor as set forth in claim 13 wherein said control circuit comprises:

a magnetic pole detecting element for detecting a magnetic pole of said rotor;

a comparator for outputting a signal of said magnetic pole detecting element;

a digital transistor for inverting output of said comparator; and transistors for controlling stator coils including said stator coil, said transistors being controlled by output of said comparator and output of said digital transistor, respectively.

21. The DC fan motor as set forth in claim 13 wherein said rectifier circuit and said control circuit are formed on said printed circuit board.

22. The DC fan motor as set forth in claim 13 wherein said DC fan motor comprises a freezing equipment fan motor.

23. The DC fan motor as set forth in claim 13 wherein said DC fan motor comprises a ventilating fan motor.

24. The DC fan motor as set forth in claim 13 wherein said DC fan motor operates from a DC high voltage of full-wave rectification and a DC low voltage of half-wave rectification, said DC fan motor having a capacitor that steps down the DC high voltage to the DC low voltage.

* * * * *